(12) United States Patent (10) Patent No.: US 8,770,061 B2
Meggiolan et al. (45) Date of Patent: Jul. 8, 2014

(54) CRANK ASSEMBLY FOR A BICYCLE BOTTOM BRACKET ASSEMBLY, SHAFT AND CRANK ARM THEREOF

(75) Inventors: Mario Meggiolan, Creazzo (IT); Maurizio Valle, Vicenza (IT)

(73) Assignee: Campagnolo S.R.L., Vicenza (IT)

( * ) Notice: Subject to any disclaimer, the term of this patent is extended or adjusted under 35 U.S.C. 154(b) by 881 days.

(21) Appl. No.: 11/586,914

(22) Filed: Oct. 26, 2006

(65) Prior Publication Data

US 2007/0137426 A1 Jun. 21, 2007

(30) Foreign Application Priority Data

Dec. 2, 2005 (EP) ..................................... 05026315

(51) Int. Cl.
*B62M 3/00* (2006.01)
(52) U.S. Cl.
CPC ..................................... *B62M 3/003* (2013.01)
USPC ........................................................ 74/594.1
(58) Field of Classification Search
USPC .............. 74/594.1, 594.2; 384/458, 545; 280/259; 403/359.1, 359.6
See application file for complete search history.

(56) References Cited

U.S. PATENT DOCUMENTS

| 529,110 | A | * | 11/1894 | Copeland ...................... 74/594.2 |
| 535,706 | A | | 3/1895 | Luther |
| 590,695 | A | * | 9/1897 | Alcorn ........................... 74/594.1 |
| 593,562 | A | | 11/1897 | Brennan |
| 594,109 | A | | 11/1897 | Weed et al. |
| 596,846 | A | | 1/1898 | Brown |
| 602,049 | A | * | 4/1898 | Beard ............................ 403/334 |
| 648,077 | A | | 4/1900 | Ludlow |
| 658,624 | A | * | 9/1900 | Egger ............................ 74/594.1 |
| 846,239 | A | | 3/1907 | Osborne |
| 951,137 | A | | 3/1910 | Lowrance |
| 1,235,530 | A | | 7/1917 | Jones |
| 1,449,235 | A | | 3/1923 | Lewis |

(Continued)

FOREIGN PATENT DOCUMENTS

CN 1522929 8/2004
DE 012 57 613 12/1967

(Continued)

OTHER PUBLICATIONS

"A Folding MWB Two-Wheeled Recumbent", Nick Abercrombie Andrews. Human Power, spring-summer 1994, 11(2), pp. 18-21.*

(Continued)

*Primary Examiner* — Thomas Diaz
(74) *Attorney, Agent, or Firm* — Volpe and Koenig, P.C.

(57) ABSTRACT

A crank assembly for a bicycle's bottom bracket assembly comprises a shaft extending along a longitudinal axis, at least one crank arm associated with at least one free end of said shaft, first front coupling means formed on said shaft and second front coupling means formed on said at least one crank arm, said first and second front coupling means being coupled together. In particular, the aforementioned first and second front coupling means comprise respective front toothings. The front coupling is located in an end zone, or on the outside, of a bottom bracket assembly's shaft's housing box formed in the bicycle's frame. The front coupling introduces a structural discontinuity between crank arm and shaft, for which reason the bending load exerted on the crank arm during pedaling is transmitted to the shaft to a small degree. Such a structural discontinuity is located at the shaft/crank arm interface.

52 Claims, 15 Drawing Sheets

(56) References Cited

U.S. PATENT DOCUMENTS

| | | | |
|---|---|---|---|
| 2,136,125 A | 11/1938 | Delaval-Crow | |
| 3,306,101 A * | 2/1967 | Holderer | 73/147 |
| 3,347,112 A | 10/1967 | Thun | |
| 3,578,829 A | 5/1971 | Hata et al. | |
| 3,888,136 A | 6/1975 | Lapeyre | |
| 3,906,811 A | 9/1975 | Thun | |
| 4,093,325 A | 6/1978 | Troccaz | |
| 4,208,763 A * | 6/1980 | Schroder | 16/378 |
| 4,300,411 A * | 11/1981 | Segawa | 74/594.2 |
| 4,331,043 A | 5/1982 | Shimano | |
| 4,406,504 A | 9/1983 | Coenen et al. | |
| 4,704,919 A | 11/1987 | Durham | |
| 4,810,040 A | 3/1989 | Chi | |
| 5,067,370 A | 11/1991 | Lemmens | |
| 5,243,879 A | 9/1993 | Nagano | |
| 5,493,937 A * | 2/1996 | Edwards | 74/594.1 |
| 5,624,519 A | 4/1997 | Nelson et al. | |
| 5,819,600 A * | 10/1998 | Yamanaka | 74/594.1 |
| 5,907,980 A | 6/1999 | Yamanaka | |
| 5,984,528 A | 11/1999 | Ohtsu | |
| 6,014,913 A * | 1/2000 | Masahiro | 74/594.1 |
| 6,116,114 A | 9/2000 | Edwards | |
| 6,192,300 B1 | 2/2001 | Watarai et al. | |
| 6,443,033 B1 | 9/2002 | Brummer et al. | |
| 6,564,675 B1 | 5/2003 | Jiang | |
| 6,581,494 B2 | 6/2003 | Sechler | |
| 6,790,535 B2 | 9/2004 | Nishimura et al. | |
| 6,829,965 B1 * | 12/2004 | Mombrinie | 74/594.2 |
| 6,886,676 B2 * | 5/2005 | von Levern et al. | 192/213.12 |
| 6,938,516 B2 | 9/2005 | Yamanaka | |
| 6,983,672 B2 | 1/2006 | Smith | |
| 7,258,041 B2 | 8/2007 | Yamanaka et al. | |
| 7,267,030 B2 | 9/2007 | French | |
| 7,503,239 B2 | 3/2009 | Yamanaka | |
| 7,798,724 B2 | 9/2010 | Van De Sanden et al. | |
| 2001/0015390 A1 | 8/2001 | Hitomi et al. | |
| 2002/0081052 A1 | 6/2002 | Chi | |
| 2002/0096015 A1 | 7/2002 | Smith | |
| 2003/0006113 A1 | 1/2003 | Terada et al. | |
| 2003/0097901 A1 | 5/2003 | Yamanaka | |
| 2004/0162172 A1 | 8/2004 | Yamanaka et al. | |
| 2005/0011304 A1 | 1/2005 | Chiang | |
| 2005/0016323 A1 | 1/2005 | Dal Pra' | |
| 2005/0040699 A1 | 2/2005 | Chiang et al. | |
| 2005/0081678 A1 | 4/2005 | Smith et al. | |
| 2005/0217417 A1 | 10/2005 | Uchida et al. | |
| 2006/0103106 A1 | 5/2006 | Schlanger | |
| 2006/0112780 A1 * | 6/2006 | Shiraishi et al. | 74/594.1 |
| 2006/0288819 A1 | 12/2006 | Dal Pra' et al. | |
| 2007/0137426 A1 | 6/2007 | Meggiolan et al. | |
| 2007/0151410 A1 | 7/2007 | Meggiolan | |
| 2007/0204722 A1 | 9/2007 | Dal Pra' | |
| 2007/0207631 A1 | 9/2007 | Meggiolan et al. | |
| 2007/0283781 A1 | 12/2007 | Meggiolan | |
| 2008/0124018 A1 | 5/2008 | Tanke et al. | |
| 2009/0145262 A1 | 6/2009 | Pasqua et al. | |
| 2009/0261553 A1 | 10/2009 | Meggiolan | |
| 2011/0049834 A1 | 3/2011 | Natu | |

FOREIGN PATENT DOCUMENTS

| | | |
|---|---|---|
| DE | 023 59 437 | 6/1975 |
| DE | 297 15 373 U1 | 8/1998 |
| DE | 200 03 398 | 5/2000 |
| EP | 0 756 991 A2 | 8/1996 |
| EP | 0 756 991 A2 | 8/1997 |
| EP | 0 924 318 | 6/1999 |
| EP | 1 120 336 | 8/2001 |
| EP | 1 314 902 | 5/2003 |
| EP | 1 342 656 A2 | 9/2003 |
| EP | 1 342 656 A3 | 9/2003 |
| EP | 1 449 760 A2 | 8/2004 |
| EP | 1 659 057 | 5/2006 |
| EP | 1 661 803 | 5/2006 |
| EP | 1 726 517 | 11/2006 |
| EP | 1 726 518 | 11/2006 |
| EP | 1 759 981 A2 | 3/2007 |
| EP | 1 759 981 A3 | 3/2007 |
| EP | 1 792 818 | 6/2007 |
| EP | 1 792 821 | 6/2007 |
| EP | 1 820 726 | 8/2007 |
| FR | 0 623 094 | 6/1927 |
| FR | 0 863 610 | 4/1941 |
| FR | 0 934 104 | 5/1948 |
| FR | 934104 | 5/1948 |
| FR | 2 801 863 | 6/2001 |
| FR | 2 870 508 | 11/2005 |
| GB | 2315776 | 2/1998 |
| JP | 57-128585 | 8/1982 |
| JP | 05319349 | 12/1993 |
| JP | 09104383 | 4/1997 |
| JP | 11225633 | 8/1999 |
| JP | 2000-289677 | 10/2000 |
| JP | 2003-261087 | 9/2003 |
| JP | 2004-106838 | 4/2004 |
| JP | 2004-249770 | 9/2004 |
| JP | 2004-275193 | 10/2004 |
| JP | 2005-001663 | 1/2005 |
| JP | 2005-053410 | 3/2005 |
| WO | 01/63134 | 8/2001 |
| WO | 02/32751 A2 | 4/2002 |
| WO | 2005-009832 | 2/2005 |
| WO | 2005/058682 | 6/2005 |

OTHER PUBLICATIONS http://web.archive.org/web/20050210021901/http://pardo.net/bike/pic/fail-005/000.html.*

English translation of Oct. 27, 2010 Office Action issued in corresponding Chinese Appln. No. 20070085427.6.

European Search Report (EP08425259), Oct. 21, 2008.

Isis Drive Standard Committee, (Copyright 2001), *The International Spline Interface Standard*, (18 pgs.).

Oct. 25, 2011 Office Action issued in Japanese Appln. No. 2006-326959.

English translation of Oct. 25, 2011 Office Action issued in Japanese Appln. No. 2006-326959.

Japanese Office Action and English translation for Application No. 2007-037411—Issued on Feb. 28, 2012.

Japanese Office Action and English translation for Application No. 2007-118028—Issued on Feb. 28, 2012.

* cited by examiner

CRANK ASSEMBLY FOR A BICYCLE BOTTOM BRACKET ASSEMBLY, SHAFT AND CRANK ARM THEREOF

FIELD OF INVENTION

The present invention relates to a crank assembly for a bicycle bottom bracket assembly, as well as a shaft and a crank arm for the crank assembly. The invention also relates to a bicycle bottom bracket assembly and bicycle comprising the aforementioned crank assembly.

BACKGROUND

As known, the bottom bracket assembly of a bicycle comprises a shaft and two crank arms associated with the opposite ends of the shaft. The shaft can be made in a separate piece from the crank arms or it can be made in a single piece with one of the two crank arms. The shaft can also consist of two separate pieces (known as half-shafts) that can be coupled together, each of the two half-shafts being made in a single piece with a respective crank arm.

The component of the bicycle bottom bracket assembly consisting of a crank arm and a shaft (or a half-shaft) coupled together or made in a single piece is identified with the expression: crank assembly.

The bottom bracket assembly is mounted on the bicycle housing the shaft in a housing box suitably provided in the bicycle frame. The rotation of the bottom bracket assembly with respect to the bicycle frame is achieved by fitting a pair of rolling bearings onto the shaft. Each bearing is positioned on the shaft at a respective shaft body portion adjacent to the crank arm and, when the bottom bracket assembly is mounted on the bicycle frame, is operatively arranged between the shaft and the housing box provided in the frame.

Due to the load applied by the cyclist on the pedals during pedaling, both the shaft and the crank arms of the bicycle bottom bracket assembly are subjected to high bending stresses. Such stresses, if not suitably counteracted, cause the shaft and/or the crank arms to bend. Such a deformation means a reduction in the efficiency of pedaling and can lead to the shaft and/or the crank arms breaking.

An ever-present demand of bicycle component manufacturers, above all for racing bicycles, is therefore to minimize the bending deformations of the shafts and of the crank arms of the bottom bracket assemblies of bicycles, so as not to alter the efficiency of pedaling and to avoid the risk of components breaking.

Conventionally, the breaking of the shaft and, above all, of the crank arms takes place precisely at the shaft-crank arm coupling zone. Such a zone is therefore a critical zone.

SUMMARY

The present invention relates, in a first aspect thereof, to a crank assembly for a bicycle bottom bracket assembly, comprising:
 a shaft extending along a longitudinal axis X-X;
 at least one crank arm associated with at least one free end of said shaft;
 coupling means between said shaft and said at least one crank arm;
 wherein said coupling means comprise first front coupling means formed on said at least one free end of said shaft and second front coupling means formed on said at least one crank arm, said first and second front coupling means being coupled together.

BRIEF DESCRIPTION OF THE DRAWINGS

Further characteristics and advantages of the present invention shall become clearer from the following detailed description of some preferred embodiments thereof, made with reference to the attached drawings. In such drawings.

DETAILED DESCRIPTION OF THE PREFERRED EMBODIMENTS

Introduction

Figure 1:
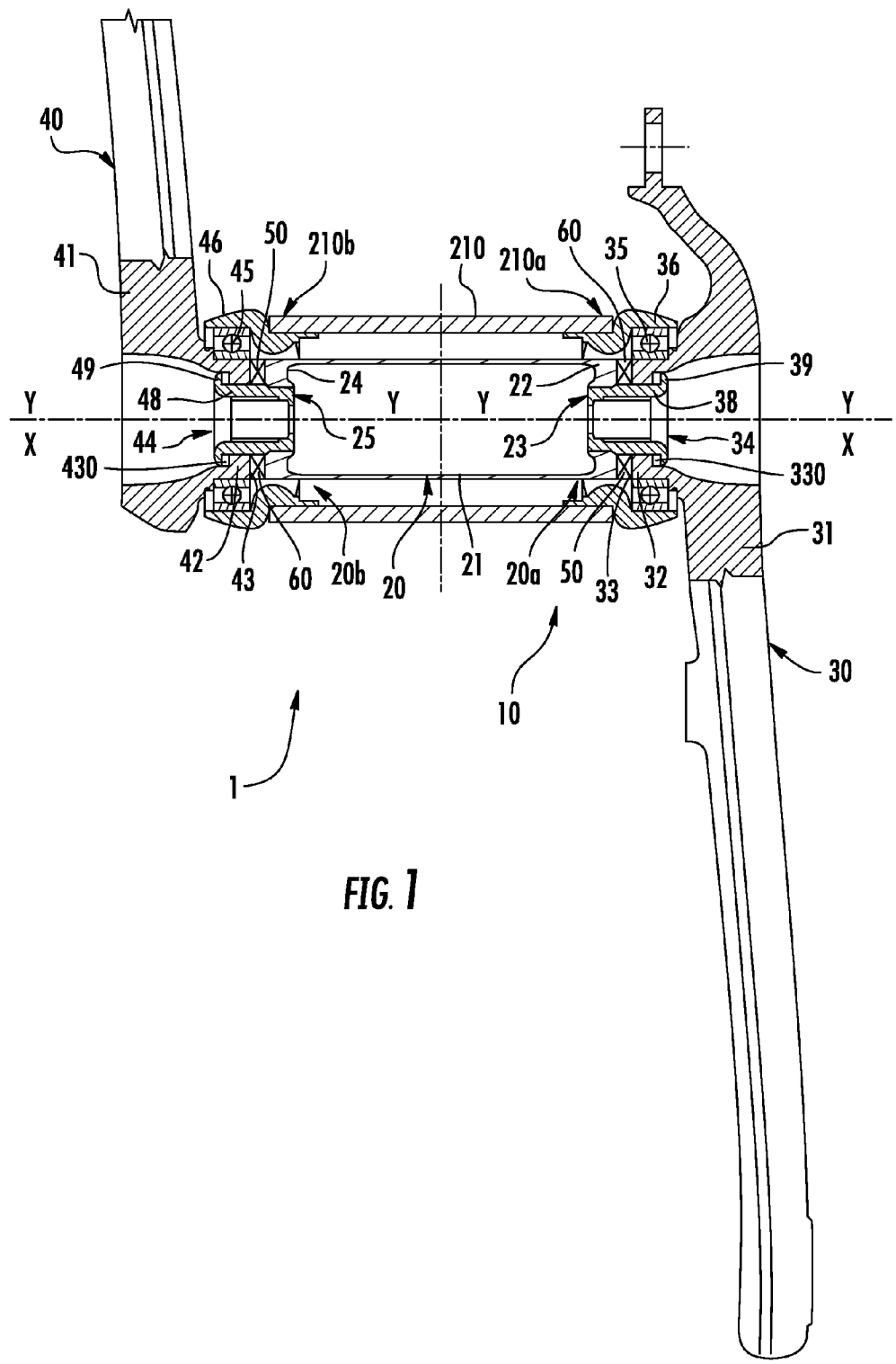
FIG. 1 is a schematic view of a longitudinal section of a first embodiment of a bottom bracket assembly comprising a first embodiment of a crank assembly in accordance with the present invention.
Figure 2:
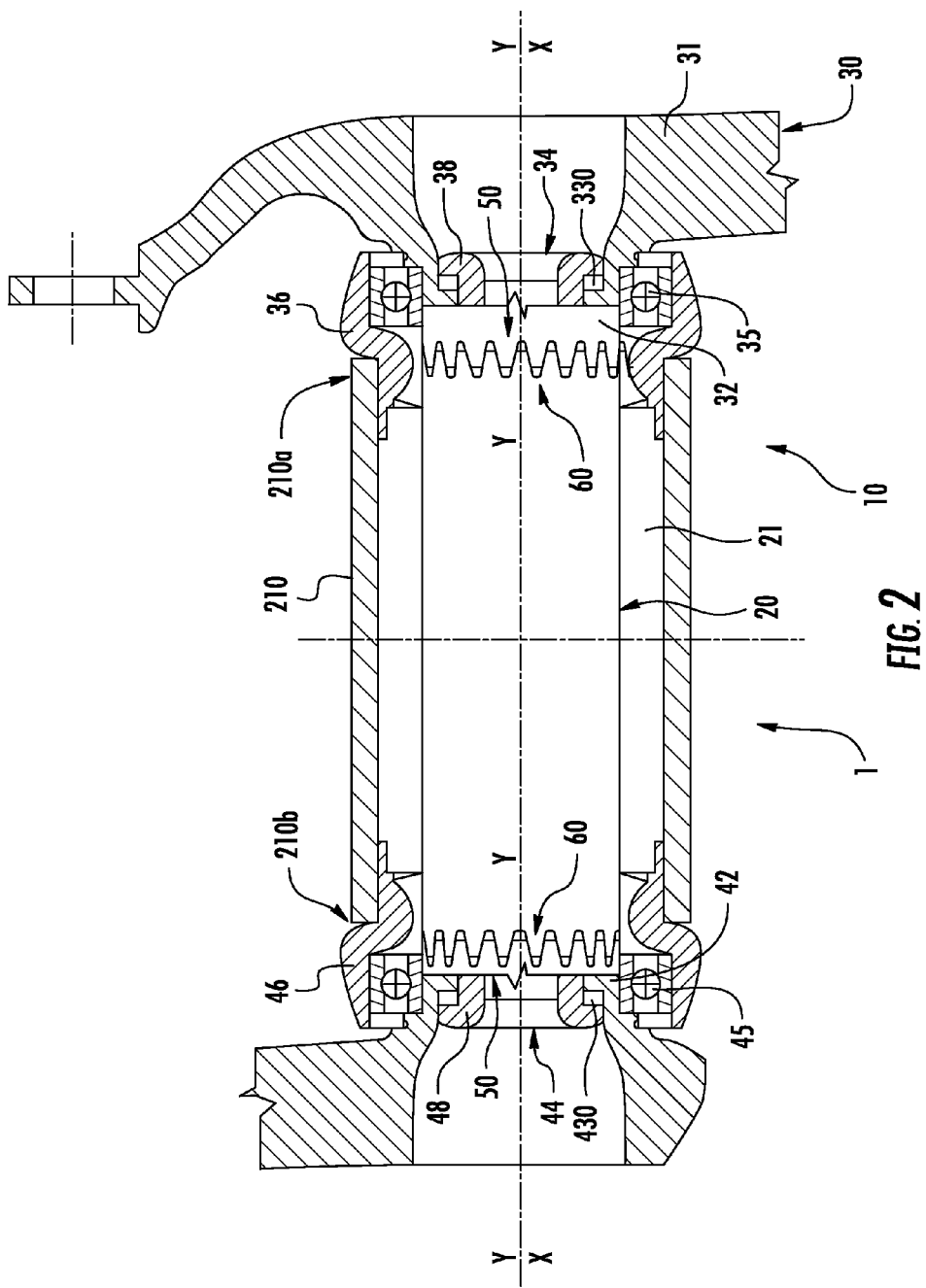
FIG. 2 is a view identical to that of FIG. 1 wherein the shaft and the corresponding coupling portion of the crank arm are represented not in section.

Throughout the present description and the subsequent claims, the expression "crank assembly" is used to indicate a component of the bicycle bottom bracket assembly obtained by coupling a crank arm with an end of the rotation shaft of the bottom bracket assembly.

The shaft can be made in a single piece with the other crank arm or in a piece separate from the other crank arm. The shaft can also be made in two separate pieces (for the sake of simplicity known as shaft elements) that can be coupled together.

In the case of a shaft made in a single piece with the other crank arm, the bottom bracket assembly is obtained by the assembly of the crank assembly of the present invention. In the case of a shaft made in a piece separate from the other crank arm, the bicycle bottom bracket assembly is obtained by the coupling of the crank assembly of the present invention with another crank arm. On the other hand, in the case of a shaft made in two pieces, the bottom bracket assembly is obtained by the coupling of two crank assemblies of the present invention or of a crank assembly of the present invention with a crank assembly wherein the shaft is made in a single piece with the other crank arm.

Throughout the present description and the subsequent claims, unless explicitly indicated otherwise, we shall refer, for the sake of simplicity, to a shaft made in a single piece. What is said does nevertheless have analogous application to the case in which the shaft is made in two separate pieces.

In accordance with the present invention, the front coupling between shaft and crank arm advantageously introduces a structural discontinuity in the propagation of the bending stress from the crank to the pedal shaft, for which reason the bending load exerted on the crank arm during pedaling is transmitted to the shaft to a much lesser degree. Even more advantageously, such a structural discontinuity is localized at the interface between shaft and crank arm, i.e. in close proximity to the zone of the crank arm at which the bending load is applied. The propagation of the bending stress is therefore interrupted at a section in which it is still minimal, given that in that section the arm of the bending torque is very small, practically zero.

The Applicant has therefore found out that it is possible to substantially reduce, if not actually almost entirely cancel out, the deformations of the shaft and of the crank arms of the bicycle bottom bracket assembly, by introducing a structural discontinuity in the propagation of the bending stress from the crank arm to the shaft in a section as close as possible to the zone of application of the bending load on the crank arm. The Applicant has thus made a solution wherein the coupling means are front coupling means and such front coupling means are provided directly at the crank arm-shaft interface, i.e. at the coupling surface of the crank arm with the shaft.

Preferably, said first front coupling means comprise first rotation-driving means and said second front coupling means comprise second rotation-driving means.

More preferably, said first rotation-driving means comprise a first front toothing extending circumferentially on a front end surface of said shaft and said second rotation-driving means comprise a second front toothing extending circumferentially on a front end surface of a coupling portion of said crank arm with said shaft.

In alternative solutions, the rotation-driving means comprise, for example, pins formed eccentrically in the front walls of the crank arms and inserted into corresponding holes made in the front walls of the shafts, or vice-versa, or a combination of pins and holes both on the front wall of the crank arm and on the front wall of the shaft.

In the preferred embodiment thereof, the crank assembly of the present invention also comprises centering means of said at least one crank arm with respect to said shaft. Such centering means advantageously allow the precise alignment between the longitudinal axis of the shaft and the axis of the corresponding coupling portion of the crank arm.

Preferably, as shall become clear in the rest of the present description, said centering means are defined by said first and second front toothings.

In the preferred embodiment of the crank assembly of the present invention, said first and second front toothings comprise a plurality of identical and symmetrical teeth, each tooth of said plurality of teeth comprising a pair of side surfaces inclined, along a direction parallel to said longitudinal axis X-X, so as to form an angle $\alpha$ of predetermined value between them. Advantageously, the inclination of the side surfaces of the teeth along the axial direction of the shaft allows a shaft-crank arm coupling to be achieved with high precision. Indeed, at each interface between tooth of the shaft and tooth of the crank arm, a sliding plane is provided that allows microdisplacements of the crank arm with respect to the shaft in the bending direction. Such microdisplacements reduce the transmission of the bending stress between the two components. Given that the sliding planes are positioned circumferentially with respect to the longitudinal axis of the shaft and to the axis of the corresponding coupling portion of the crank arm, the aforementioned microdisplacements also occur during the rotation of the bottom bracket assembly.

Preferably, said angle $\alpha$ has a value of between 14° and 40°. Advantageously, the Applicant has found that within such a range of values the axial thrusts between shaft and crank arm are reduced to the point of allowing the use of a locking screw (necessary to axially lock the crank arm to the shaft) of small size, i.e. such as to be able to allow the screw to be housed inside the shaft. This allows the use of a shaft having a central portion of greater diameter with respect to the end portions. Moreover, the housing of the screw inside the shaft makes the screwing and unscrewing operations of such a screw quicker and easier even when the bottom bracket assembly is associated with the bicycle frame. Such a screw, indeed, can be immediately reached from the outside with a suitable tool without having to dismount the crank assembly from the frame.

In particular, the Applicant has found that a particularly preferred value of the angle $\alpha$ is 27°.

In the preferred embodiment of the crank assembly of the present invention, said side surfaces of said tooth are also inclined with respect to a radial plane containing said longitudinal axis X-X, so as to form an angle $\beta$ of predetermined value between them. Advantageously, the inclination of the side surfaces of the teeth along the radial direction perpendicular to the longitudinal axis of the shaft and to the axis of the corresponding coupling portion of the crank arm ensures the centering of the shaft-crank arm coupling.

Preferably, said angle $\beta$ has a value equal to the standard value for a Hirth toothing.

Preferably, to favor the aforementioned microdisplacements the contact between teeth of the shaft and teeth of the crank arm occurs solely between the side surfaces of such teeth. However, a solution is foreseen wherein the contact also, or solely, occurs at the surface of the throats defined between the teeth of the respective toothings; in such a solution the surface of the throats is inclined in the axial and radial direction in a similar way to what has been stated above with reference to the teeth of the shaft and of the crank arm.

Preferably, each throat has a curved base surface joined to the side surfaces of said teeth.

In accordance with a preferred embodiment of the crank assembly of the present invention, such an assembly comprises at least one bearing adapted to allow the rotation of the bottom bracket assembly with respect to a suitable housing box formed in the bicycle frame. The bearing is associated with said at least one crank arm at a seat formed on an outer surface of the coupling portion with the shaft.

Advantageously, the arrangement of a seat for the bearing directly on the crank arm allows the transmission of the bending stress from the crank arm directly to the bicycle frame, i.e. without engaging the shaft. The latter is therefore free from any bending stresses. More advantageously, the housing of the bearing on the crank arm allows the arm of the bending torque acting on the shaft and on the crank arm itself to be substantially reduced, thus reducing the risk of breaking such components and at the same time improving the efficiency of pedaling. Even more advantageously, in this way it is possible to house the bearing outside of the housing box of the bottom bracket assembly suitably provided in the bicycle frame. This allows the use of shafts having a diameter greater than that of the shafts conventionally used; the shaft of the present invention thus has a bending and twisting resistance greater than that of the shafts conventionally used.

In a first preferred embodiment of the bottom bracket assembly of the present invention, said seat is defined by an outer surface of said coupling portion of said crank arm.

In a second preferred embodiment of the crank assembly of the present invention, said at least one crank arm comprises a substantially annular crank arm body portion that is radially outside of said coupling portion and wherein said seat is defined by an inner surface of said substantially annular crank arm body portion.

The crank arm of the crank assembly of the present invention can be a right crank arm or a left crank arm.

In a particularly preferred embodiment of the crank assembly of the present invention, said shaft comprises a central portion and opposite end portions, wherein said central portion has a diameter greater than that of said opposite end portions. Such a shaft advantageously has a structural bending and a twisting resistance greater than that of a shaft having cross sections with constant diameter.

Preferably, said shaft is made in a single piece. However, an alternative solution is foreseen wherein said shaft is made in two separate pieces coupled together through coupling means, preferably through front toothings of the type described above. A further alternative solution is also foreseen wherein said shaft is made integrally with the other crank arm of the bicycle bottom bracket assembly.

In a second aspect thereof, the present invention relates to a bottom bracket assembly that comprises a crank assembly of the type described above.

Throughout the present description and the subsequent claims, the expression "bottom bracket assembly", is used to indicate a component of the bicycle bottom bracket assembly obtained by coupling a crank assembly as defined above with another crank arm.

Preferably, the crank arm of the crank assembly is a right or left crank arm and also the other crank arm of the bottom bracket assembly is coupled with the shaft through front coupling means of the type described above. The shaft, in this case, is thus made in a single piece separate from both of the crank arms.

Alternatively, the other crank arm can be coupled with the shaft through a threaded coupling.

In a further alternative embodiment of the aforementioned bottom bracket assembly, the shaft is made in a single piece with the other crank arm.

In the case in which the shaft is made in a single piece separate from the other crank arm, the bottom bracket assembly thus comprises two crank arms and a shaft as described above. On the other hand, in the case in which the shaft is made in two pieces (shaft elements) separate from the respective crank arms, the bottom bracket assembly comprises two crank arms and two shaft elements as described above, i.e. two crank assemblies of the present invention. If the two shaft elements are of the same length, the two crank assemblies shall be perfectly identical (apart from the different shape of the right crank arm from the left crank arm). However, a solution is foreseen wherein the two shaft elements are of different lengths.

In a third aspect thereof, the present invention relates to a shaft for a bicycle bottom bracket assembly, comprising a body extending along a longitudinal axis X-X, said body comprising, at least one free end thereof, coupling means with at least one crank arm, wherein said coupling means comprise front coupling means.

Such a shaft can advantageously be used to manufacture the crank assembly discussed above and, therefore, has all of the aforementioned advantageous characteristics with reference to the shaft of the crank assembly of the present invention.

Preferably, such a shaft has one or more of the structural characteristics discussed above as preferred characteristics of the shaft of the crank assembly of the present invention.

In a fourth aspect thereof, the present invention relates to a bicycle crank arm, comprising a body having a coupling portion with a shaft of a bicycle bottom bracket assembly, said coupling portion extending along an axis Y-Y and comprising, at a free end thereof, coupling means with said shaft, wherein said coupling means comprise front coupling means.

Such a crank arm can advantageously be used to manufacture the crank assembly discussed above and, therefore, has all of the aforementioned advantageous characteristics with reference to the crank arm of the crank assembly of the present invention.

Preferably, such a crank arm also has one or more of the structural characteristics discussed above as preferred characteristics of the crank arm of the crank assembly of the present invention.

In a fifth aspect thereof, the present invention relates to a bicycle, comprising a frame provided with a housing box of a shaft of a bottom bracket assembly, said shaft extending along a longitudinal axis X-X, said bottom bracket assembly also comprising a pair of crank arms, at least one crank arm of said pair of crank arms being associated with at least one free end of said shaft, and coupling means between said shaft and said at least one crank arm;

wherein said coupling means comprise first front coupling means formed on said shaft and second front coupling means formed on said at least one crank arm, said first and second front coupling means being coupled together.

Advantageously, such a bicycle comprises the crank assembly of the present invention and therefore has all of the aforementioned advantageous characteristics.

Preferably, the crank assembly used in the bicycle discussed above has one or more of the preferred structural characteristics discussed above with reference to the crank assembly of the present invention.

In a preferred embodiment of the bicycle of the present invention, said first and second front coupling means are arranged at an end zone of said box.

In a particularly preferred embodiment of the bicycle of the present invention, said first and second front coupling means are arranged outside said box.

In the particularly preferred embodiment thereof, the bicycle of the present invention also comprises a pair of bearings adapted to allow said bottom bracket assembly to rotate in said box, wherein at least one bearing of said pair of bearings is arranged outside said box and at a seat defined on said at least one crank arm of said pair of crank arms.

DESCRIPTION

Figure 12:
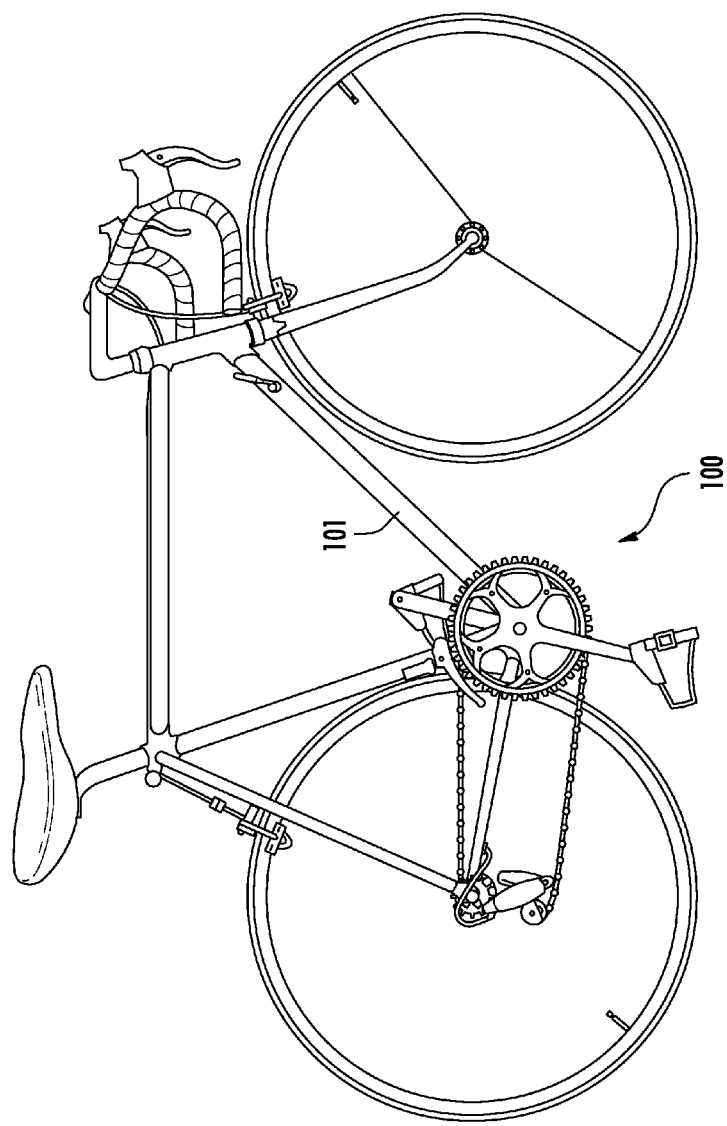
FIG. 12 shows a racing bicycle that comprises the bottom bracket assembly of FIG. 1.

In the attached figures, a bottom bracket assembly of a bicycle is indicated with 1. Such a bicycle is indicated with 100 in FIG. 12. The bottom bracket assembly 1 is mounted on the frame 101 of the bicycle 100, in a suitable housing box 210.

The bottom bracket assembly 1 comprises a crank assembly 10 in accordance with the present invention. The bottom bracket assembly 1 in turn comprises a shaft 20, extending along a longitudinal axis X-X and having opposite free coupling ends 20a, 20b, and a pair of crank arms 30, 40 coupled with said free ends 20a, 20b of the shaft 20.

Figure 5:
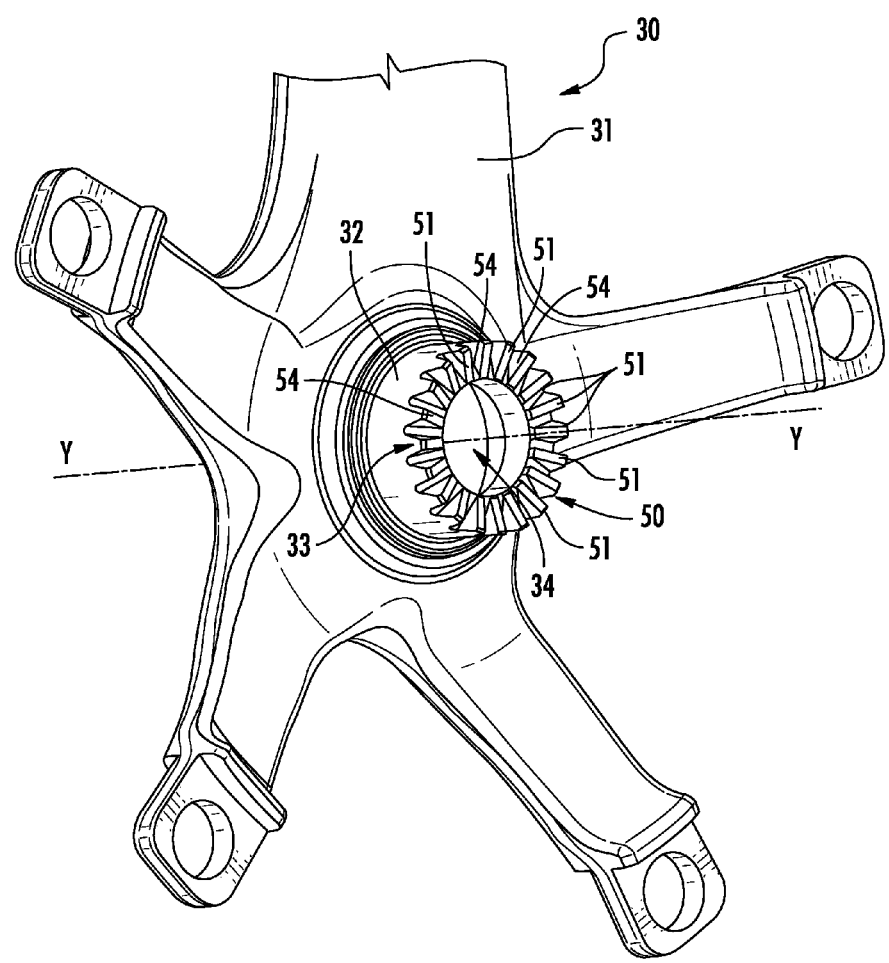
FIG. 5 is a schematic perspective view of the right crank arm of the crank assembly illustrated in FIG. 1.
Figure 7:
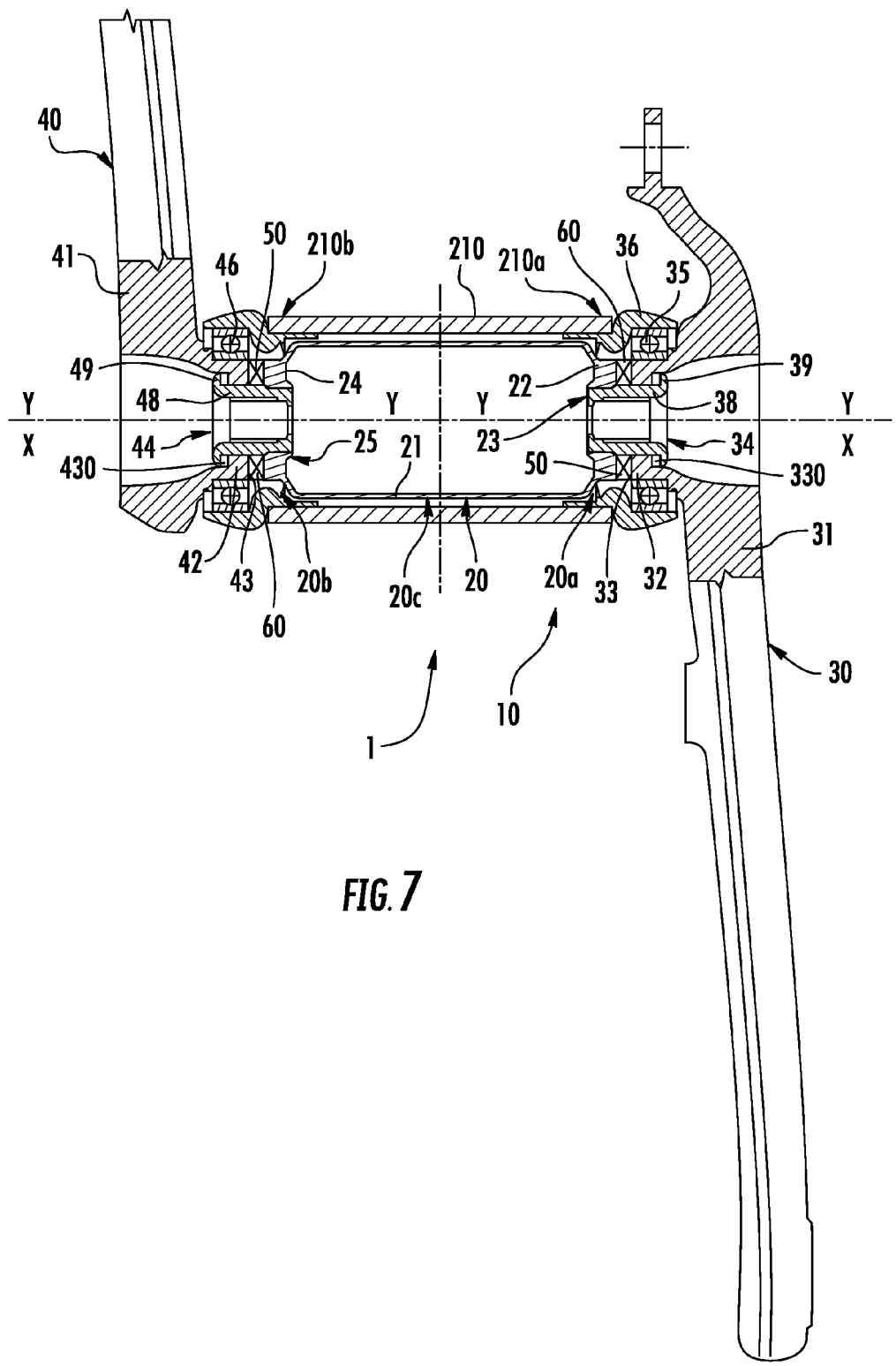
FIG. 7 is a schematic view of a longitudinal section of a bottom bracket assembly comprising an alternative embodiment of a crank assembly in accordance with the present invention.
Figure 8:
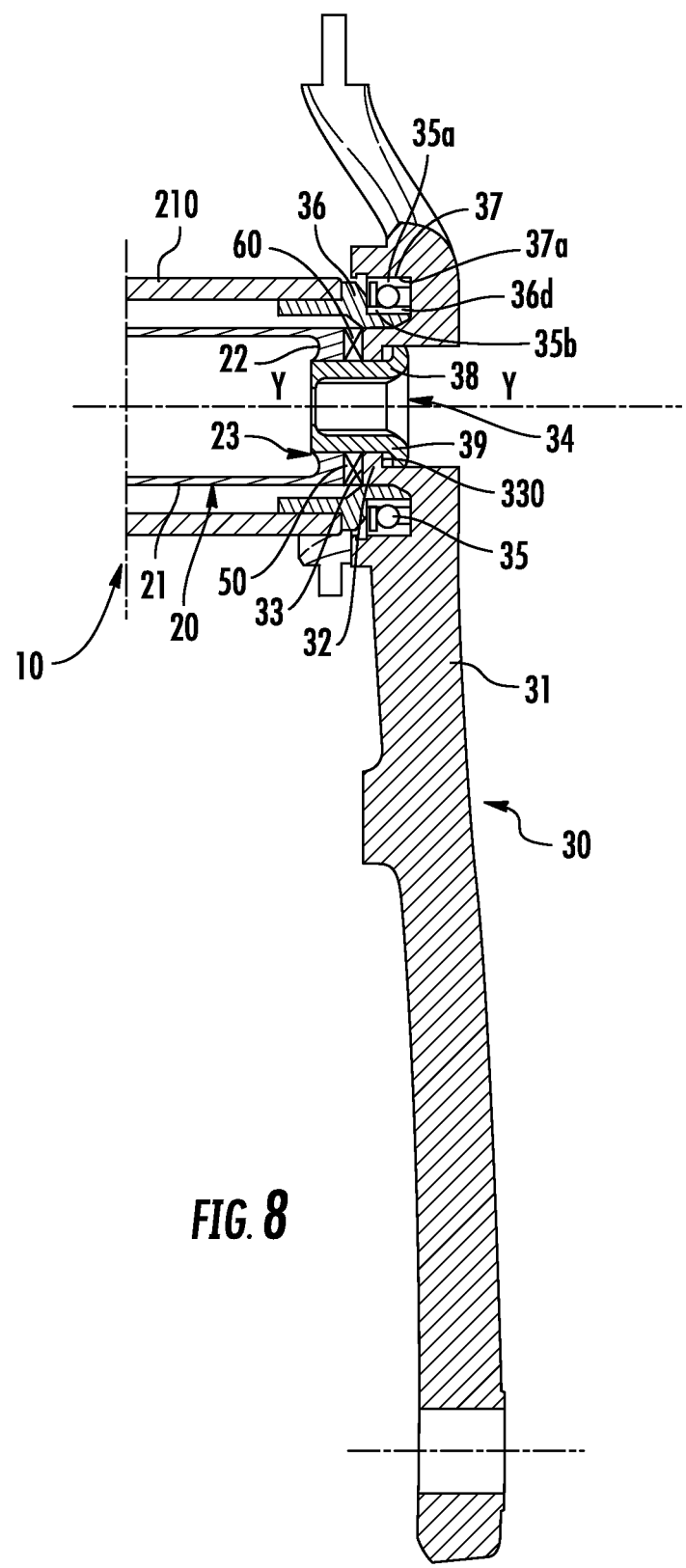
FIG. 8 is a schematic view of a longitudinal section of an end portion of a bottom bracket assembly comprising a further embodiment of a crank assembly in accordance with the present invention.
Figure 9:
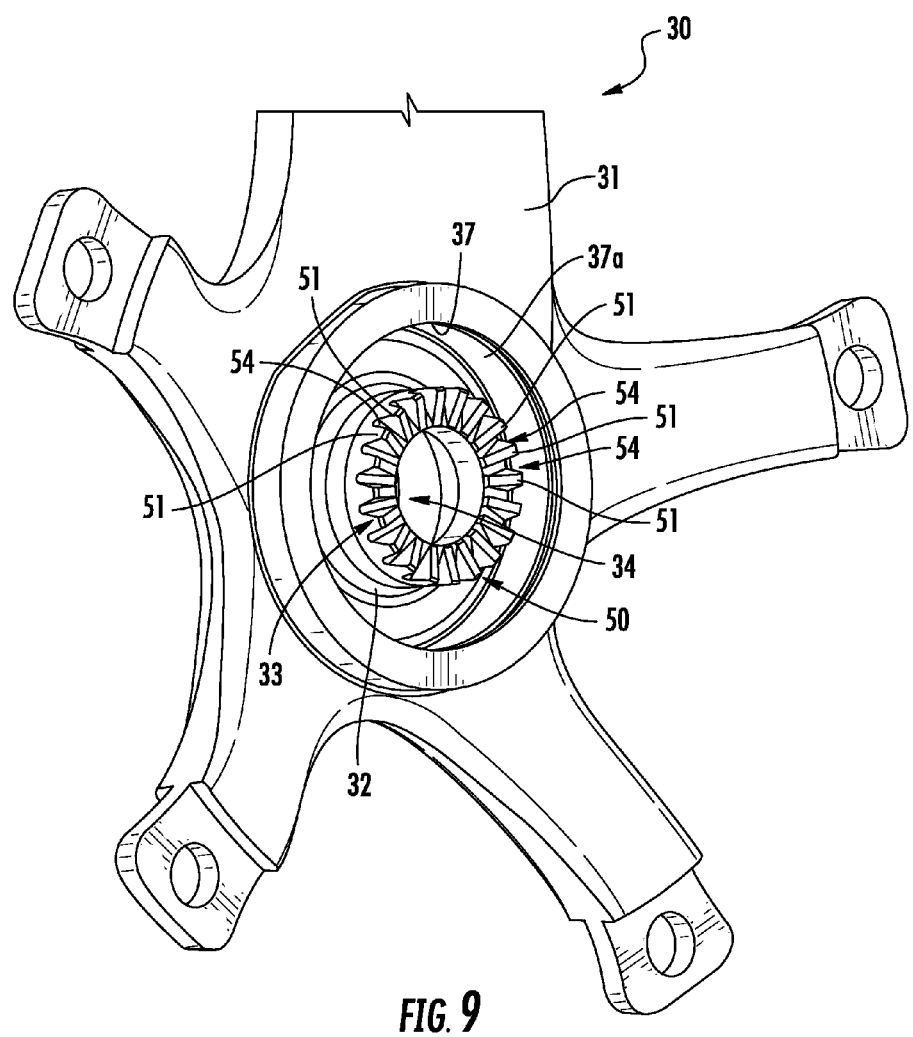
FIG. 9 is a schematic perspective view of the right crank arm of the crank assembly illustrated in FIG. 8.

FIGS. 1, 2, 6-8, and 10 show various embodiments of the crank assembly 10, whereas FIGS. 5 and 9 show just the crank arms 30 of the aforementioned assemblies.

The crank arm 30 is a right crank arm (of the branched type, illustrated better in FIGS. 5 and 9) and is coupled with the free end 20a of the shaft 20, whereas the crank arm 40 is a left crank arm and is coupled with the free end 20b of the shaft 20.

The shaft 20, in particular, comprises a tubular body 21 made in a single piece. The shaft 20 is housed inside the housing box 210 suitably provided in the frame 101 of the bicycle 100. The shaft 20 extends longitudinally for a length substantially equal to the length of the housing box 210.

The shaft 20, at the free end 20a thereof, has a front surface 22 having, at its center, a threaded hole 23. Similarly, the shaft 20, at the free end 20b thereof, has a front surface 24 having, at its center, a threaded hole 25.

In the embodiment illustrated in FIGS. 1, 2, 5-7, the crank arm 30 comprises a body 31 having an annular coupling portion 32 projecting cantilevered from the rest of the body 31. The coupling portion 32 of the crank arm 30 comprises substantially cylindrical radially outer and inner surfaces extending along an axis Y-Y and has an axially outer front coupling surface 33 with the free end 20a of the shaft 20 (see in particular FIG. 5) and an axially inner front surface 330. Similarly, the crank arm 40 comprises a body 41 having an annular coupling portion 42 projecting cantilevered from the rest of the body 41. The body coupling portion 42 of the crank arm 40 comprises substantially cylindrical radially outer and inner surfaces extending along an axis Y-Y and has an axially outer front coupling surface 43 with the free end 20b of the shaft 20 and an axially inner front surface 430.

At the coupling portion 32, the body 31 of the crank arm 30 has a through hole 34 that extends up to the front coupling surface 33 with the shaft 20. Similarly, at the coupling portion 42, the body 41 of the crank arm 40 has a through hole 44 that extends up to the front coupling surface 43 with the shaft 20.

The front surface 33 of the crank arm 30 faces the front surface 22 of the shaft 20, with the through hole 34 coaxial to the threaded hole 23 of the shaft 20, whereas the front surface 43 of the crank arm 40 faces the front surface 24 of the shaft 20, with the through hole 44 coaxial to the threaded hole 25 of the shaft 20. The axes Y-Y of the crank arms 30, 40 therefore, once they are coupled with the shaft 20, are aligned with the longitudinal axis X-X of the latter.

The bottom bracket assembly 1 is supported in rotation within the box 210 by a pair of ball bearings, respectively indicated with 35 and 45. Such bearings 35, 45 are associated with the crank arms 30 and 40 and are positioned outside the housing box 210 of the shaft 20, thanks to the use of suitable adapters 36, 46 described below.

In particular, the bearing 35 is active between an annular adapter 36, screwed into a free end 210a of the box 210, and the crank arm 30. Similarly, the bearing 45 is active between an annular adapter 46, screwed into the free end 210b of the box 210, and the crank arm 40.

As shown in FIGS. 1, 2, 5, 6, 7 and 10 (see specifically FIG. 2), the adapters 36 and 46 comprises a ring nut having a cylindrical body portion 36a, 46a, externally threaded near 36b, 46b, intended to be screwed onto an inner threading 210c, 210d made at the end of the box 210 of the frame 101 and an opposite cylindrical body portion 36c, 46c having a smooth surface that is intended to operate in radial abutment against a race ring 35a, 45a of the bearing 35, 45.

In a first embodiment of the crank arms, illustrated in FIGS. 1, 2, 5, 6 and 7 (see specifically FIG. 2), the bearings 35, 45 are fitted, respectively, on the outer surface 32a, 42a of the coupling portions 32, 42 of the crank arms 30, 40. Such outer surfaces 32a, 42a thus define housing seats for the inner race ring 35b, 45b of the bearings 35, 45, whereas the outer race ring 35a, 45a thereof operates in radial abutment against a smooth inner surface of the adapters 36, 46.

In an alternative embodiment of the crank arms, illustrated in FIGS. 8 and 9 with particular reference to a right crank arm 30, the body 31 of the crank arm 30 has a substantially annular portion 37 radially outside the coupling portion 32. In this embodiment, the bearings 35 operate between an inner surface 37a of said annular body portion 37 of the crank arm 30 and a smooth outer surface 36d of the adapter 36. The inner surface 37a of the annular body portion 37 of the crank arm 30 thus defines a radial abutment surface for the outer race ring 35a of the bearing 35, whereas the smooth outer surface 36d of the adapter 36 defines a radial abutment seat for the inner race ring 35b of the bearing 35. The left crank arm of the bottom bracket assembly that engages the right crank arm described above is preferably identical, with reference to the housing portion of the respective bearing, to such a right crank arm.

Figure 13:
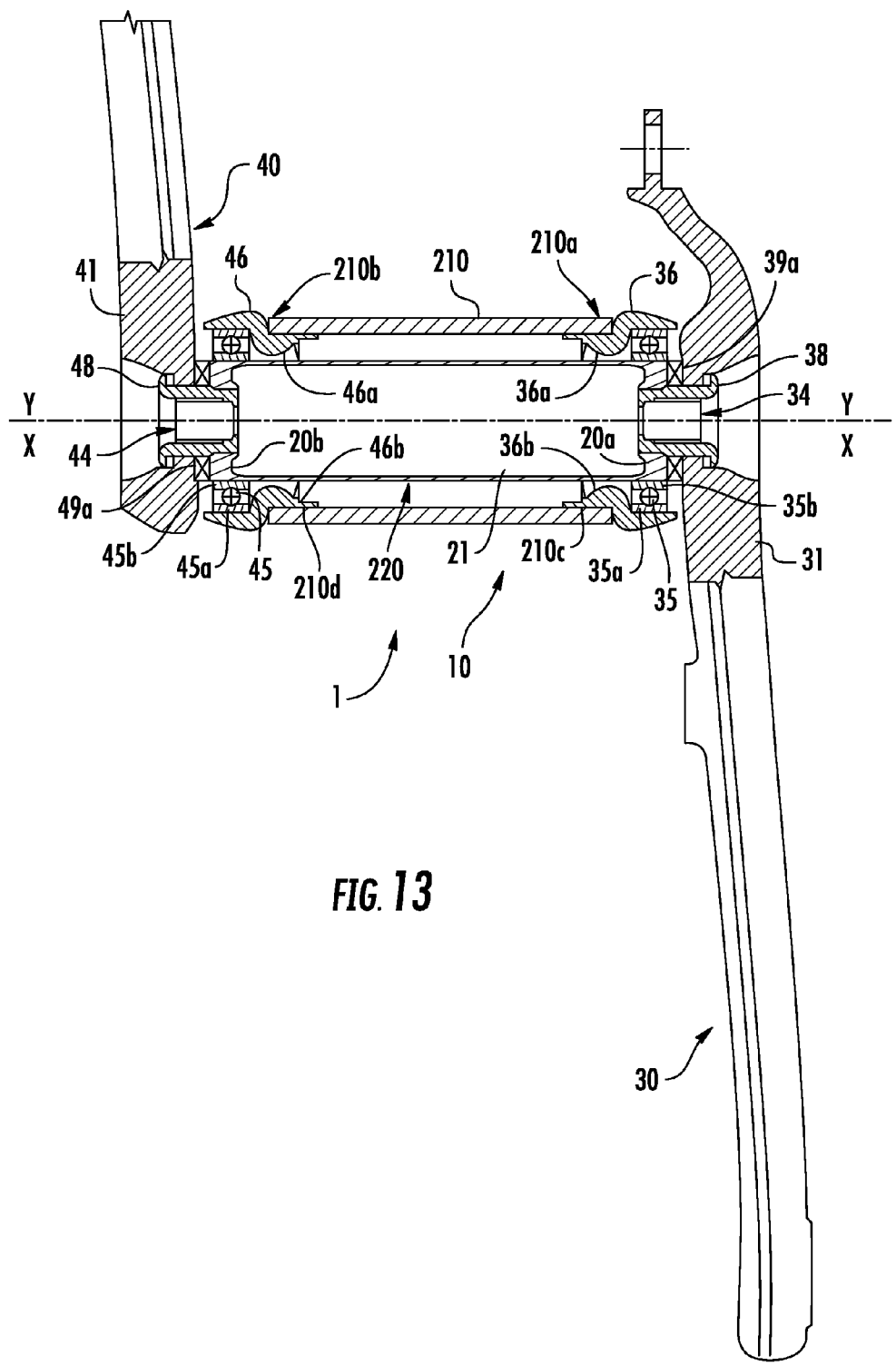
FIG. 13 is a view identical to that of FIG. 1 wherein the shaft and the corresponding coupling portion of the crank arm are represented not in section.

In a further embodiment illustrated in FIG. 13, the bearings 35, 45 are fitted on the opposite end portions 20a, 20b of a shaft 220. In such a case the shaft 220 is longer than the housing box 210 provided in the frame 101 of the bicycle 100 by a length at least equal to twice the length of the race rings of the bearings. In such a case the coupling portion 32, 42 of the crank arms 30, 40 may not be present, and the shaft 220 is separated by the crank arms 30, 40 by a washer 39a, 49a.

With reference to FIGS. 1, 2, 7, 8, the crank arm 30 is coupled with the free end 20a of the shaft 20 through a screw 38 inserted into the through hole 34 of the crank arm 30 and screwed into the threaded hole 23 of the shaft 20. Similarly, the crank arm 40 is coupled with the free end 20b of the shaft 20 through a screw 48 inserted into the through hole 44 of the crank arm 40 and screwed into the threaded hole 25 of the shaft 20.

The screws 38, 48 comprise respective annular flanges 39, 49 that when fully threaded, abut against the surfaces 330, 430 of the coupling portions 32, 42 of the crank arms 30, 40.

Figure 11:
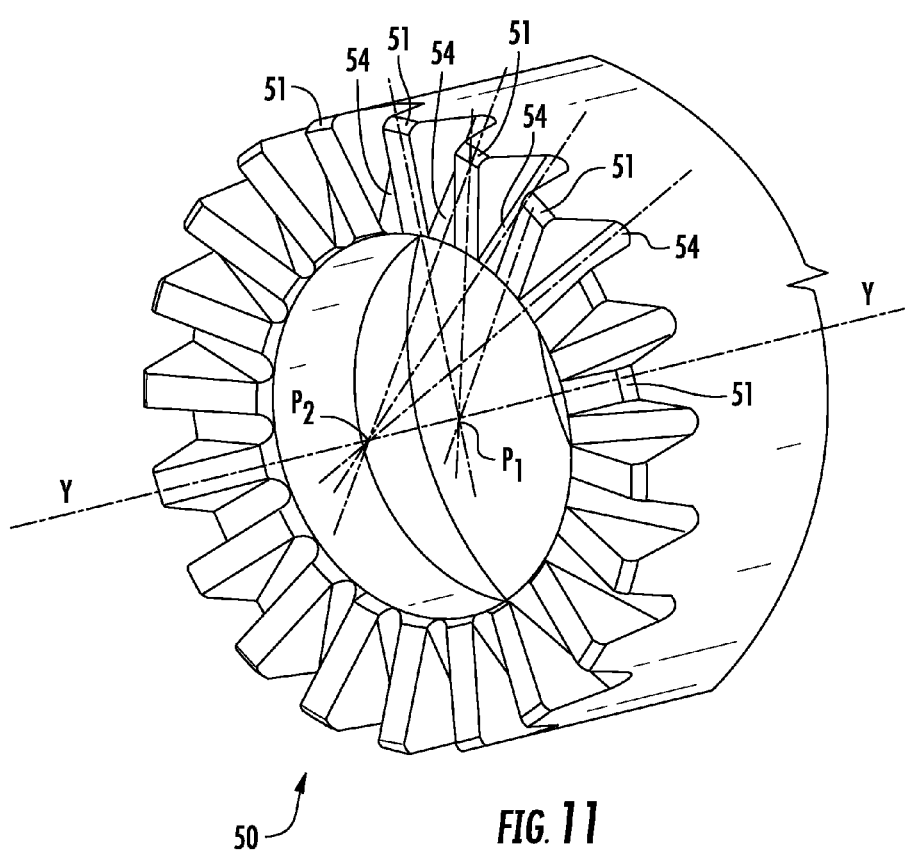
FIG. 11 shows a detail of the crank arm of FIG. 5.

The crank arms 30, 40 are also coupled with the opposite free ends 20a, 20b of the shaft 20 through respective front toothings. In particular, a front toothing 50 or rotation-driving means is formed on the front surface 33 of the crank arm 30 and on the front surface 43 of the crank arms 40, whereas a front toothing or rotation-driving means 60 matching the toothing 50 is formed on the outer faces of the opposite front surfaces 22 and 24 of the shaft 20. The front toothing 50 extends circumferentially on the front surfaces 33, 43 of the crank arms 30, 40, whereas the front toothing 60 extends circumferentially on the opposite front surfaces 22, 24 of the shaft 20. The front toothings 50 and 60, coupling together, make the shaft 20 and the crank arms 30 and 40 integral in rotation. FIGS. 2-4 and 6 shows the toothings or coupling means 50 and 60 coupled with each other. FIGS. 5 and 11, on the other hand, clearly show the toothing 50 of the crank arm 30.

The front toothings 50 and 60 preferably comprise a plurality of identical and symmetrical teeth. As shown in particular in FIG. 3, the teeth of the front toothings 50 of the crank arms 30 and 40 are indicated with 51, whereas the teeth of the front toothings 60 of the shaft 20 are indicated with 61. Each tooth 51 of the front toothing 50 comprises a top surface 52 and two side surfaces 53. The teeth 51 are spaced apart by throats 54. Similarly, each tooth 61 of the front toothing 60 comprises a top surface 62 and two side surfaces 63. The teeth 61 are spaced apart by throats 64.

Each throat 54, 64 is defined between two adjacent teeth 51, 61 and has a curved base surface joined to the side surfaces 53, 63 of said teeth.

The side surfaces 53 and 63 of the teeth 51 and 61 are inclined, along a direction parallel to the longitudinal axis X-X of the shaft 20 and to the axis Y-Y of the crank arms 30 and 40, so as to form an angle α between them having a value preferably comprised between 14° and 40°, more preferably equal to 27°.

Figure 4:
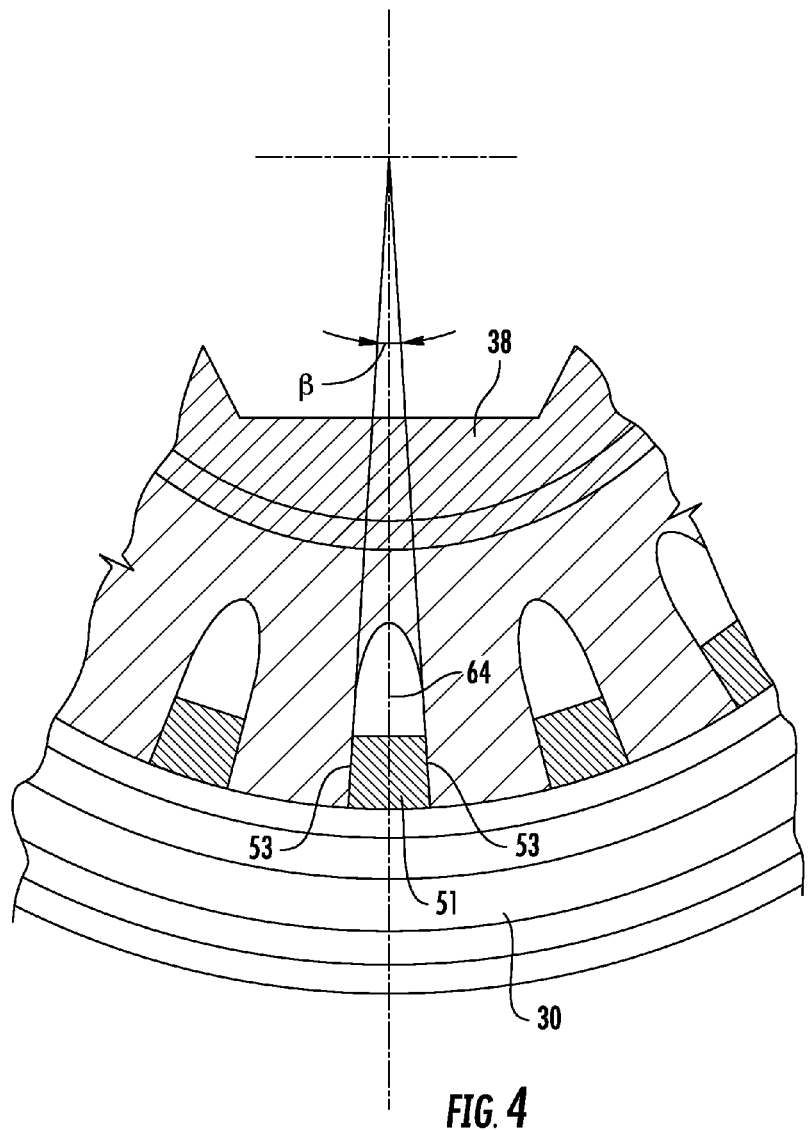
FIG. 4 is a schematic view of a cross section of the shaft-crank arm coupling zone of FIG. 3 taken along the lines III-III.

As shown in FIG. 4, the side surfaces 53 and 63 of the teeth 51 and 61 are also inclined with respect to a radial plane containing said longitudinal axis X-X of the shaft 20 and said axis Y-Y of the crank arms 30 and 40, so as to form an angle β between them having a value preferably equal to the standard value of a Hirth toothing.

FIG. 11 shows the front toothing 50 of the crank arm 30 in detail. The toothing 60 of the shaft 20 is preferably identical, as well as the toothing 50 of the crank arm 40 in the case in which it is coupled with the shaft in a way similar to the way of the crank arm 30. The front toothing 50 comprises in particular twenty teeth 51 alternating with twenty throats 54; the number of teeth and of throats can be different, but it is preferably even in number.

It can be seen how the top surfaces of each tooth 51 lie on an ideal cone with vertex in the point P1 on the axis Y-Y. The bottom surfaces of each throat 54 also lie on an ideal cone, but with opposite concavity to the previous one, and with the vertex in the point P2, again on the axis Y-Y.

Basically, the teeth 51 and 61 are wedge-shaped tapered in the axial direction with an angle α and in the radial direction with an angle β. As a consequence of such geometry of the teeth, a coupling with toothing of the type described above provides, in general, the contact just between the side surfaces of the teeth 53. The coupling of all of the wedges of the front toothing 50 with those of the front toothing 60 ensures the centering of the shaft-crank arm coupling.

Figure 3:
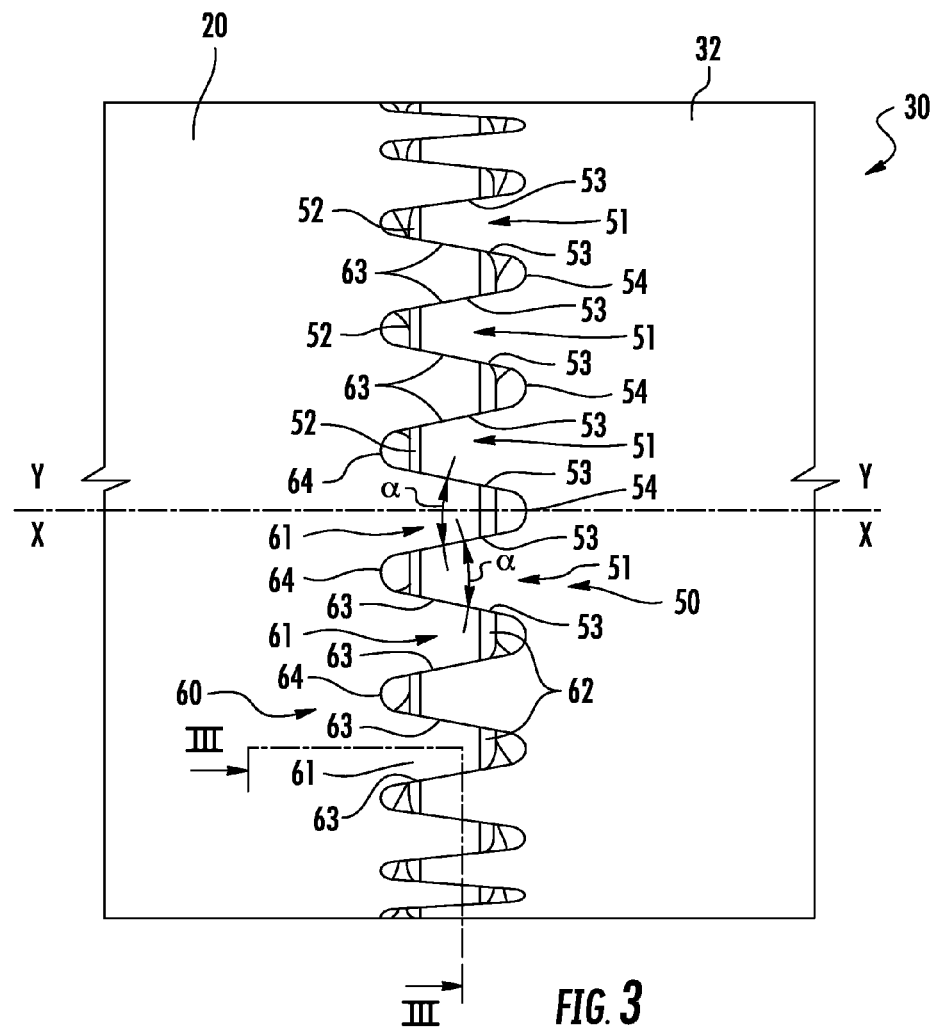
FIG. 3 is an enlarged side schematic view of the shaft-crank arm coupling zone of the crank assembly illustrated in FIG. 1.
Figure 3A:
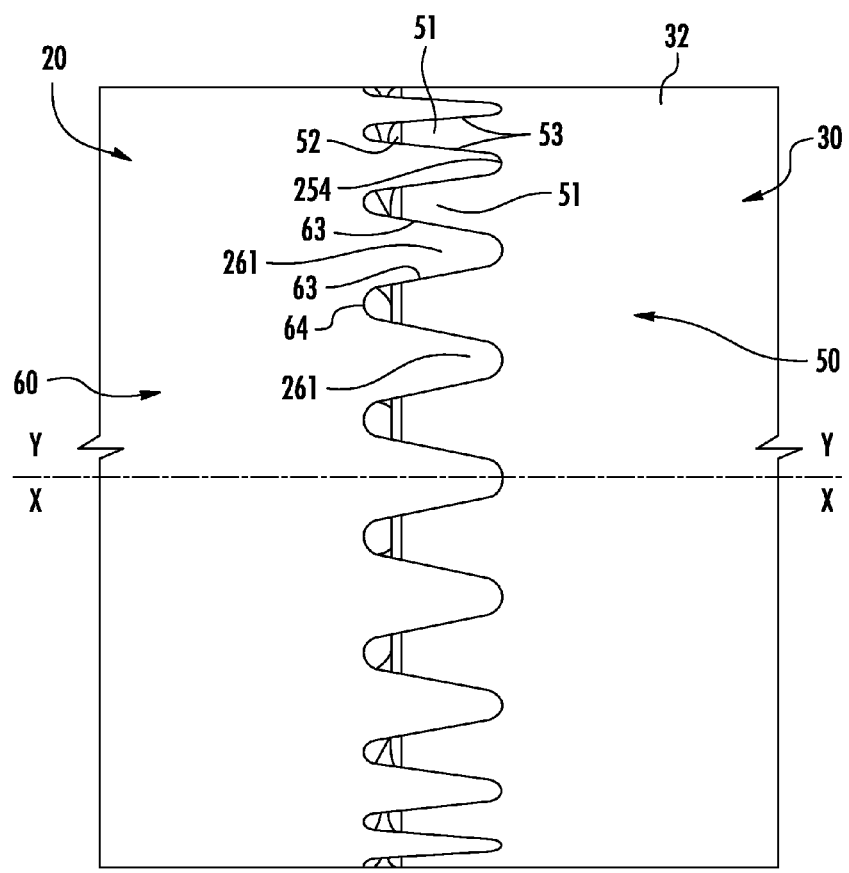
FIGS. 3A and 3B are second and third enlarged side schematic views of the shaft-crank arm coupling zone of the crank assembly illustrated in FIG. 1.
Figure 3B:
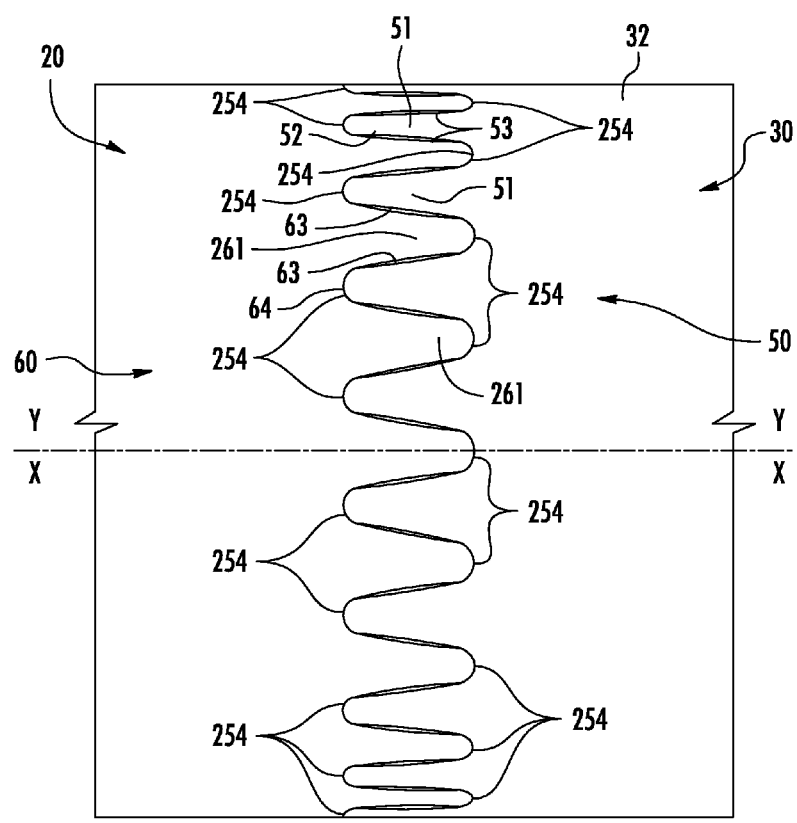

As already stated, the contact between the teeth 61 of the shaft 20 and the teeth 51 of the crank arms 30 and 40 occurs solely between the side surfaces 53, 63 of such teeth. However, FIG. 3A shows a solution wherein the throats 254 and 64 of the toothings 50 and 60 are inclined in the axial and radial direction in a similar way to what has been stated above with reference to the teeth of the shaft and of the crank arms. In such a case, the contact between the toothings 50 and 60 can also, or solely occur at the curved base surfaces of such throats as in best seen in the change with respect to the throat 254. Each tooth 261 of the front toothing 60 has two side surfaces 63 and is apart by throats 64.

In the case in which the coupling portion 32, 42 of the crank arms 30, 40 is not present (this case has been discussed above with reference to the solution wherein the bearings 35, 45 are fitted on the opposite ends of the shaft 20), the front toothing 50 is made directly on a face of the body of the crank arms 30, 40 not projecting from the rest of the body of the crank arms itself (see for example FIG. 9).

In any case, the front toothing 50 of the crank arms 30, 40 is made with respect to the body of the crank arms themselves in such a way that, when the bottom bracket assembly is associated with the frame 101 of the bicycle 100, such a toothing is coupled with that of the shaft 20 in an end zone 210a, 210b of the housing box 210 provided in the frame 101, or outside of the housing box 210, and the bearings 35, 45 are also positioned in the aforementioned end zone or outside of the aforementioned box 210.

In a preferred embodiment of the bottom bracket assembly of the present invention, discussed above with reference to FIGS. from 1 to 5, the crank arms 30 and 40 are coupled with the shaft 20 in an identical way.

Figure 6:
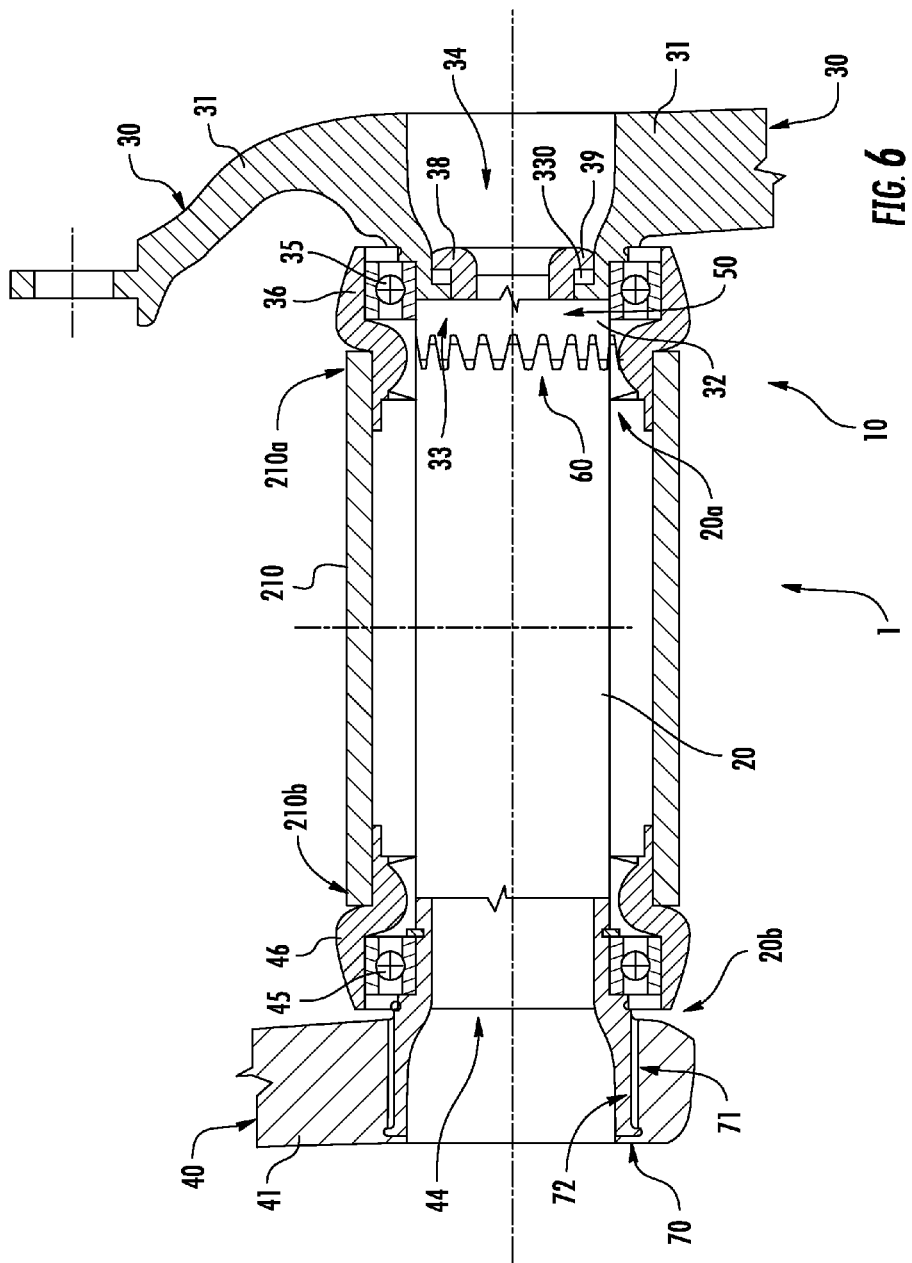
FIG. 6 is a schematic view of a longitudinal section of a second embodiment of a bottom bracket assembly comprising the crank assembly illustrated in FIG. 1.

FIG. 6 shows an alternative embodiment of the bottom bracket assembly 1 of the present invention. Such an embodiment differs from the one described with reference to FIGS. 1-5 for the sole reason that the left crank arm 40 is associated with the shaft 20 through a threaded coupling 70. Such a threaded coupling 70 comprises an outer threading 71 made on the end portion 20b of the shaft 20 and an inner threading 72, matching the threading 71, made in the hole 44 of the crank arm 40. In such an embodiment, the shaft 20 is of a length such that its end portion 20b projects from the box 210 of the frame 101. The bearing 45 is fitted onto such a shaft portion projecting from the box 210.

In the embodiments of the bottom bracket assembly described above, the shaft 20 has a constant diameter along its longitudinal extension.

FIG. 7 shows a further embodiment of the bottom bracket assembly of the present invention. Such an embodiment differs from the one described previously with reference to FIGS. from 1 to 5 for the sole reason that the shaft 20 has a central portion 20c having a diameter greater than that of said opposite end portions 20a, 20b.

What has been stated above remains valid in the case in which the shaft 20 is made in two separate pieces (shaft elements). Such two pieces of shaft shall each be coupled with a crank arm in the way described above and shall also be coupled together, preferably, through front toothings of the type described above.

Figure 10:
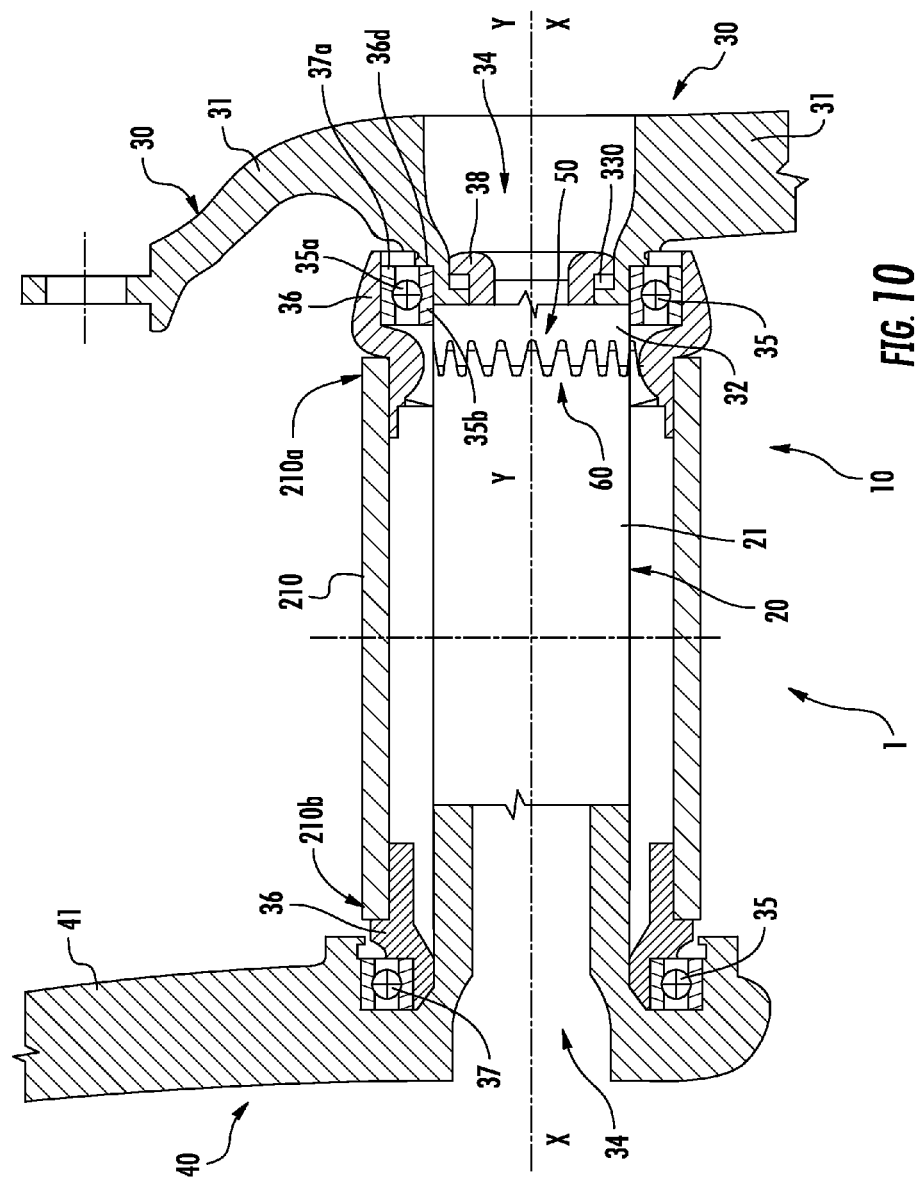
FIG. 10 is a schematic view, partially in longitudinal section, of a further embodiment of a bottom bracket assembly comprising the crank assembly illustrated in FIG. 1.

FIG. 10 shows a further alternative embodiment of the bottom bracket assembly of the present invention. Such an embodiment differs from the one described previously with reference to FIGS. 1-5 for the sole reason that the left crank arm 40 is made in a single piece with the shaft 20. In such a case, to avoid transferring to the shaft 20 of the bending load to which the crank arm 40 is subjected during pedaling, a crank arm of the type illustrated in FIGS. 8 and 9 is used, where, however, the front toothing 50 is absent since the body 41 of the crank arm 40 is made integrally with the body 21 of the shaft 20. In particular, the left bearing 35 operates between the inner surface 37a of the annular portion 37 of the body 41 of the crank arm 40 and a smooth outer surface 36d of the left adapter 36. Such an adapter 36 is screwed to the end 210b of the housing box 210 provided in the frame 101 and projects cantilevered from this end 210b. The inner surface 37a of the annular body portion 37 of the crank arm 40 thus defines a radial abutment surface for the outer race ring 35a of the left bearing 35, whereas the smooth outer surface 36d of the adapter 36 defines a radial abutment seat for the inner race ring 35b of the bearing 35.

What is claimed is:

1. Crank assembly for a bicycle bottom bracket assembly, comprising:
   a right crank arm and a left crank arm;
   a shaft having a body extending along a longitudinal axis by a predetermined distance to join the right and left crank arms in an assembly;
   at least one of said crank arms being associated with at least one free end of said shaft;
   at least one coupling between said at least one free end of said shaft and said at least one crank arm;
   wherein said at least one coupling comprises a first front toothing extending circumferentially on a front end surface of said at least one free end of said shaft, and a second front toothing extending circumferentially on a front end surface of an annular portion of said at least one crank arm associated with said at least one free end of said shaft, the first and second front toothings each having an axial end surface that is sloped along a radius of said annular portion of said crank arm, a plurality of teeth that each includes a pair of side surfaces, and a plurality of throats, each throat being defined between two adjacent teeth, wherein contact between said first and second front toothings occurs solely at a curved base surface of said throats defined between said first and second front toothings.

2. Crank assembly according to claim 1, wherein said first front toothing comprises first rotation-driving elements and said second front toothing comprises second rotation-driving elements.

3. Crank assembly according to claim 1, further comprising centering means of said at least one crank arm associated with said at least one free end of said shaft with respect to said shaft.

4. Crank assembly according to claim 1, further comprising centering means of said at least one crank arm associated with said at least one free end of said shaft with respect to said shaft, wherein said centering means are defined by said first and second front toothings.

5. Crank assembly according to claim 1, wherein each tooth of said first and second front toothings is identical and symmetrical, and said side surfaces of each tooth are inclined along a direction parallel to said longitudinal axis, so as to form an angle α between them having a first predetermined value.

6. Crank assembly according to claim 5, wherein said first value is between 14° and 40°.

7. Crank assembly according to claim 6, wherein said first value is equal to 27°.

8. Crank assembly according to claim 5, wherein said side surfaces of said tooth are inclined with respect to a radial plane containing said longitudinal axis, so as to form an angle β between them having a second predetermined value.

9. Crank assembly according to claim 5, wherein said curved base surface of said plurality of throats is a curved base surface joined to said side surfaces of adjacent teeth.

10. Crank assembly according to claim 1, wherein said at least one crank arm associated with said at least one free end of said shaft comprises a seat for housing a bearing adapted to allow the rotation of the bottom bracket assembly with respect to a housing box of said shaft formed in a frame of a bicycle.

11. Crank assembly according to claim 10, wherein said seat is defined by an outer surface of said annular portion of said at least one crank arm associated with said at least one free end of said shaft.

12. Crank assembly according to claim 10, further comprising a rolling bearing associated at said seat with said at least one crank arm associated with said at least one free end of said shaft.

13. Crank assembly according to claim 1, wherein said at least one crank arm associated with said at least one free end of said shaft is said right crank arm.

14. Crank assembly according to claim 1, wherein said at least one crank arm associated with said at least one free end of said shaft is said left crank arm.

15. Crank assembly according to claim 1, wherein said shaft comprises a central portion and opposite end portions and wherein said central portion has a diameter greater than that of said opposite end portions.

16. Bottom bracket assembly of a bicycle, comprising a crank assembly according to claim 1.

17. Bottom bracket assembly according to claim 16, wherein the shaft of said crank assembly is made in a single piece with a crank arm opposite the crank arm of said crank assembly.

18. Bottom bracket assembly according to claim 16, wherein the crank arm of said crank assembly is a right crank arm or a left crank arm and wherein the other crank arm is coupled with said shaft through a threaded coupling.

19. Shaft for a bicycle bottom bracket assembly, comprising a body extending along a longitudinal axis by a predetermined distance, said body comprising, at least one free end thereof, a plurality of coupling surfaces that couple the shaft with at least one crank arm, wherein said coupling surfaces extend uninterrupted over an entire axial end surface of the shaft and are inclined at oblique angles with respect to the longitudinal axis of the shaft, the oblique angles intersecting the longitudinal axis of the shaft, each of said coupling surfaces having a plurality of teeth that each includes a pair of side surfaces and a top surface, and a plurality of throats, each throat being defined between two adjacent teeth, wherein contact between said coupling surfaces of said shaft and said coupling surfaces of said at least one crank arm occurs solely at a curved base surface of said throats defined between said teeth of only one of said coupling surfaces of said shaft and said at least one crank arm and/or between said side surfaces of said teeth of both said coupling surfaces of said shaft and said at least one crank arm.

20. Shaft according to claim 19, wherein said coupling surfaces are formed as part of a front coupling means that comprise rotation-driving means of said at least one crank arm.

21. Shaft according to claim 19, further comprising centering means of said at least one crank arm with respect to said shaft.

22. Shaft according to claim 20, wherein said plurality of teeth of said coupling surfaces of said shaft extends circumferentially on a front end surface of said body.

23. Shaft according to claim 22, wherein each tooth of said pluralities of teeth is identical and symmetrical, and said pair of side surfaces of each tooth are inclined along a direction parallel to said longitudinal axis, so as to form an angle α between them having a first predetermined value.

24. Shaft according to claim 23, wherein said first value is between 14° and 40°.

25. Shaft according to claim 24, wherein said first value is equal to 27°.

26. Shaft according to claim 23, wherein said side surfaces of said tooth are inclined with respect to a radial plane containing said longitudinal axis, so as to form an angle β between them having a second predetermined value.

27. Shaft according to claim 23, wherein said curved base surface of said plurality of throats is a curved base surface joined to said side surfaces of adjacent teeth.

28. Shaft according to claim 19, comprising, at an end portion thereof, an outer threading.

29. Shaft according to claim 19, wherein said body comprises a central portion and opposite end portions, wherein said central portion has a diameter greater than that of said end portions.

30. Shaft according to claim 19, wherein said body is made in a single piece.

31. Crank arm of a bicycle, comprising a body having a coupling portion with a shaft of a bottom bracket assembly of a bicycle, said coupling portion projecting along a rotational axis of the crank arm by a predetermined distance and comprising, at a free end thereof, coupling teeth that project from and extend uninterrupted over an entire axial end surface of the coupling portion and a plurality of throats, each throat being defined between two adjacent teeth, each one of the teeth comprising opposite side surfaces connected by at least one top surface, wherein the top surface is inclined at an oblique angle with respect to the rotational axis of the crank arm, wherein contact between said coupling teeth of said crank arm and said shaft occurs solely at a curved base surface of said throats defined between said teeth of only one of said crank arm and said shaft and/or between said side surfaces of said teeth of both said crank arm and said shaft.

32. Crank arm according to claim 31, wherein said coupling teeth comprise rotation-driving means of said shaft.

33. Crank arm according to claim 31, further comprising centering means of said shaft with respect to said crank arm.

34. Crank arm according to claim 32, wherein said rotation-driving means are comprised in said coupling teeth.

35. Crank arm according to claim 34, wherein said coupling teeth comprise a plurality of identical and symmetrical teeth, said side surfaces of each tooth of said plurality of teeth inclined along a direction parallel to said longitudinal axis, so as to form an angle α between them having a first predetermined value.

36. Crank arm according to claim 35, wherein said first value is between 14° and 40°.

37. Crank arm according to claim 36, wherein said first value is equal to 27°.

38. Crank arm according to claim 35, wherein said side surfaces of said tooth are inclined with respect to a radial plane containing said longitudinal axis, so as to form an angle β between them having a second predetermined value.

39. Crank arm according to claim 35, wherein said curved base surface of said plurality of throats is a curved base surface joined to said side surfaces of adjacent teeth.

40. Crank arm according to claim 31, comprising a seat for housing a bearing adapted to allow the rotation of said crank arm when associated with said shaft, with respect to a housing box of said shaft formed in a frame of a bicycle.

41. Crank arm according to claim 40, wherein said seat is defined by an outer surface of said coupling portion of said crank arm body.

42. Crank arm according to claim 40, comprising a substantially annular crank arm body portion radially outside with respect to said coupling portion, said seat being defined by an inner surface of said substantially annular crank arm body portion.

43. Crank arm according to claim 31, wherein said crank arm is a right crank arm.

44. Bicycle, comprising a frame provided with a housing box of a shaft of a bottom bracket assembly, said shaft having a body extending along a longitudinal axis by a predetermined distance to join a pair of crank arms in an assembly, at least one crank arm of said pair of crank arms being associated with at least one free end of said shaft, and a coupling between said at least one free end of said shaft and said at least one crank arm;
wherein said at least one coupling comprises a first front toothing extending circumferentially on a front end surface of said at least one free end of said shaft, and a second front toothing extending circumferentially on a front end surface of an annular portion of said at least one crank arm associated with said at least one free end of said shaft, the first and second front toothings each having an axial end surface that is sloped along a radius of said annular portion of said crank arm and a plurality of teeth that each includes a pair of side surfaces, and a plurality of throats, each throat being defined between two adjacent teeth, wherein contact between said first and second front toothings occurs solely at a curved base surface of said throats defined between said teeth of only one of said first and second front toothings and/or between said side surfaces of said teeth of both first and second front toothings.

45. Bicycle according to claim 44, wherein said first and second front toothings are arranged at an end zone of said box.

46. Bicycle according to claim 44, also comprising a pair of bearings suitable for allowing the rolling of said bottom bracket assembly in said box, wherein at least one bearing of said pair of bearings is arranged outside said box and at a seat defined on said at least one crank arm of said pair of crank arms.

47. Crank assembly for a bicycle bottom bracket assembly, comprising:
a right crank arm and a left crank arm;
a shaft having a body extending along a longitudinal axis by a predetermined distance to join the right and left crank arms in an assembly;
at least one of said crank arms being associated with at least one free end of said shaft; and
a coupling between said at least one free end of said shaft and said at least one crank arm associated with said at least one free end of said shaft;
wherein said coupling comprises first front coupling teeth projecting axially from an axial end surface of said at least one free end of said shaft, each of the first front coupling teeth including respective opposite side surfaces joined by a first top surface and a plurality of first throats defined between adjacent teeth, the first top surface being inclined at an oblique angle with respect to the longitudinal axis of the shaft, and second front coupling teeth projecting axially from an axial end surface of said at least one crank arm associated with said at least one free end of said shaft, each of the second front coupling teeth including respective opposite side surfaces joined by a second top surface and a plurality of second throats defined between adjacent teeth, the second top surface being inclined at an oblique angle with respect to the longitudinal axis of the shaft, top surfaces are displaced from the plurality of second throats, and the second top surfaces are displaced from the plurality of first throats, said first and second front coupling teeth being coupled together such that contact between said first and second front toothings occurs solely at a curved base surface of only one of said first and second plurality of throats and/or between said side surfaces of said teeth of both first and second front coupling teeth.

48. A crank arm of a bicycle, comprising a body having a coupling portion with a shaft of a bottom bracket assembly of a bicycle, said coupling portion projecting along a rotational axis of the crank arm by a predetermined distance and comprising, at a free end thereof, a coupling with a free end of said shaft,
wherein said coupling comprises a front coupling that comprises a front toothing that projects from and extends uninterrupted over an entire front surface at an axial end of the coupling portion, said front toothing having an axial end surface that is inclined at an oblique angle with respect to the rotational axis of the crank arm, a plurality of teeth that each includes a pair of side surfaces, and a plurality of throats, each throat being defined between two adjacent teeth, wherein contact between said front toothing of said crank arm and said shaft occurs solely at a curved base surface of said throats defined between said teeth of only one of said crank arm and said shaft and/or between said side surfaces of said teeth of both said crank arm and said shaft, wherein said front coupling rotationally drives said shaft and aligns the rotational axis of the crank arm with a rotational axis of the shaft.

49. Crank arm according to claim 48, wherein each tooth of said front toothing is identical and symmetrical, and said side surfaces of each tooth are inclined along a direction parallel to said longitudinal axis, so as to form an angle α between them having a first predetermined value.

50. Crank arm according to claim 49, wherein said side surfaces of said teeth are inclined with respect to a radial plane containing said longitudinal axis, so as to form an angle β between them having a second predetermined value.

51. A bicycle crank and bottom bracket comprising:
a housing extending along a longitudinal axis and having spaced apart ends;
a shaft positioned within the housing and having a body extending along the longitudinal axis by a predetermined distance with a first defined toothed pattern that extends circumferentially over an end surface of at least one free axial end of the shaft;
two crank arms rotatably mounted to the housing and joined in an assembly by the shaft, where at least one of the two crank arms has a coupling portion with a second defined toothed pattern that corresponds to the first defined toothed pattern associated with the at least one free axial end of the shaft, the second defined toothed pattern extending circumferentially over an end surface of the coupling portion of the at least one of the two crank arms; and
coupling means arranged between the crank arms and the housing;
whereby the first and second defined toothed patterns are mated and the shaft connects the two crank arms in a centered relationship about the longitudinal axis, the first and second defined toothed patterns each having an axial end surface that is sloped along a radius of the shaft, a plurality of teeth that each includes a pair of side surfaces, and a plurality of throats, each throat being defined between two adjacent teeth, wherein contact between said first and second defined toothed patterns occurs solely at a curved base surface of said throats defined between said teeth of only one of said first and second defined toothed patterns and/or between said side surfaces of said teeth of both first and second defined toothed patterns.

52. A bicycle crank and bottom bracket comprising:
a housing extending along a longitudinal axis and spaced apart ends;
a shaft positioned within the housing and extending along the longitudinal axis by a predetermined distance with spaced apart first and second axial ends that each has a defined toothed pattern that extends uninterrupted over an entire end surface of a respective one of the first and second axial ends;
right and left crank arms, each having a coupling portion with a defined toothed pattern that extends uninterrupted over an entire end surface of the coupling portion and corresponds to the defined toothed pattern associated with one of the first and second axial ends of the shaft; and
coupling means between the crank arms and the housing;
whereby the toothed patterns of the right and left crank arms mates with the toothed patterns of the first and second axial ends of the shaft, the coupling means rotatably mounts the crank arms to the housing, and the shaft connects the crank arms in a centered relationship about the longitudinal axis, each one of the defined toothed patterns of the crank arms and the first and second axial ends of the shaft having an axial end surface inclined at an oblique angle with respect to the longitudinal axis, a plurality of teeth that each includes a pair of side surfaces, and a plurality of throats, each throat being defined between two adjacent teeth, wherein contact between the toothed patterns of the right crank arm and the first axial end of the shaft occurs solely at a curved base surface of the throats defined between the teeth of only one of the right crank arm and the first axial end of the shaft and/or between the side surfaces of the teeth of both the right crank arm and the first axial end of the shaft, and contact between the toothed patterns of the left crank arm and the second axial end of the shaft occurs solely at a curved base surface of the throats defined between the teeth of only one of the left crank arm and the second axial end of the shaft and/or between the side surfaces of the teeth of both the left crank arm and the second axial end of the shaft.

* * * * *